(12) United States Patent
Weiss

(10) Patent No.: US 6,892,935 B2
(45) Date of Patent: *May 17, 2005

(54) METHOD FOR ACCURATE AND SECURE VOTING

(76) Inventor: Roger E. Weiss, 10 Mary Way, Foxboro, MA (US) 02035

( * ) Notice: Subject to any disclaimer, the term of this patent is extended or adjusted under 35 U.S.C. 154(b) by 0 days.

This patent is subject to a terminal disclaimer.

(21) Appl. No.: 10/460,532

(22) Filed: Jun. 12, 2003

(65) Prior Publication Data

US 2003/0212593 A1 Nov. 13, 2003

Related U.S. Application Data

(63) Continuation-in-part of application No. 09/994,126, filed on Nov. 26, 2001, now Pat. No. 6,722,562
(60) Provisional application No. 60/253,240, filed on Nov. 27, 2000.

(51) Int. Cl.[7] .............................................. G07C 13/00
(52) U.S. Cl. ...................... 235/51; 235/54 F; 235/386
(58) Field of Search ................................. 235/379, 386, 235/51, 54 F

(56) References Cited

U.S. PATENT DOCUMENTS

| | | | | |
|---|---|---|---|---|
| 5,604,800 A | * | 2/1997 | Johnson et al. | ............. 713/189 |
| 5,610,980 A | * | 3/1997 | Johnson et al. | ............. 713/189 |
| 5,619,574 A | * | 4/1997 | Johnson et al. | ............... 705/64 |
| 5,644,710 A | * | 7/1997 | Johnson et al. | ............. 713/200 |
| 5,682,428 A | | 10/1997 | Johnson | ....................... 705/71 |
| 5,689,564 A | * | 11/1997 | Johnson et al. | ............. 713/165 |
| 5,692,049 A | * | 11/1997 | Johnson et al. | ............. 713/189 |
| 5,694,472 A | * | 12/1997 | Johnson et al. | ............. 713/189 |
| 5,696,825 A | * | 12/1997 | Johnson et al. | ............. 713/193 |
| 5,727,061 A | * | 3/1998 | Johnson et al. | ............. 713/165 |
| 6,722,562 B2 | | 4/2004 | Weiss | ........................... 235/56 |
| 2003/0052160 A1 | | 3/2003 | Glover | ...................... 235/375 |

FOREIGN PATENT DOCUMENTS

JP 08202785 A 8/1996
JP 09007035 A 1/1997

* cited by examiner

Primary Examiner—Karl D. Frech
(74) Attorney, Agent, or Firm—Brian M. Dingman, Esq.; Mirick, O'Connell, DeMallie & Lougee, LLP

(57) ABSTRACT

A method for secure, electronic, distributed voting using existing automated teller machines (ATMs), comprising issuing each voter an access card that can be read by an ATM and a personal identification number (PIN). This card may be a standard bank credit or debit card. ATMs are enabled to read access cards and accept PINs. In response to the reading of an access card and appropriate PIN entry, information relating to the vote to be cast is displayed at the ATM. The user is allowed to cast votes using one or more ATM functions. A particular ATM function is identified as an indication of finalization of the vote. In response, the finalized vote is automatically tallied.

21 Claims, 1 Drawing Sheet

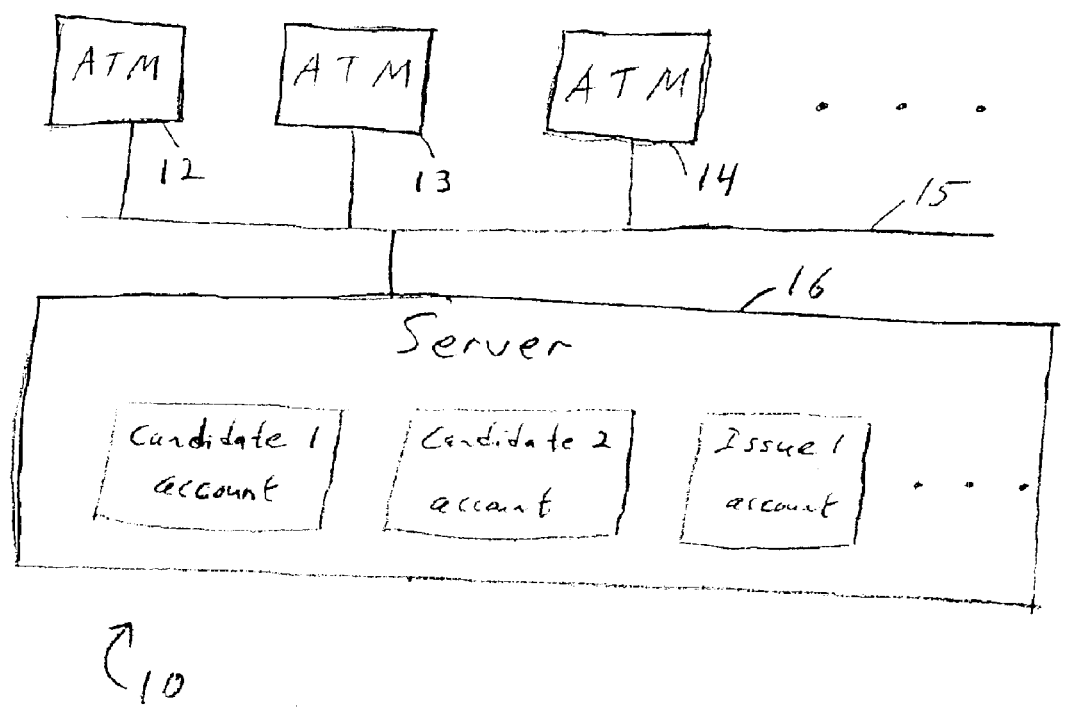

METHOD FOR ACCURATE AND SECURE VOTING

CROSS-REFERENCE TO RELATED APPLICATION

This application is a continuation in part of application Ser. No. 09/994,126, filed on Nov. 26, 2001, now U.S. Pat. No. 6,722,562, which claims benefit of Provisional No. 60/253,240, filed Nov. 27, 2000.

FIELD OF THE INVENTION

This invention relates to a system and method for accomplishing voting using the existing banking network for automated teller machines.

BACKGROUND OF THE INVENTION

The 2000 Presidential election clearly demonstrated deep fundamental problems in the equipment and methods used for voting. These defects have been known for many years, but prior to this invention there has not been an available, cost effective way of obtaining a secure, accurate, timely and affordable universal voting system. The present methods vary from town to town based on what equipment was purchased and when. As a result, the quality of the electoral process is not what it could be.

SUMMARY OF THE INVENTION

It is therefore an object of this invention to provide a method for accomplishing secure, electronic, distributed voting using the existing banking network that is in place for automated teller machines (ATMs).

This invention features a method for secure, electronic, distributed voting using the existing banking network for automated teller machines (ATMs). Each voter is issued unique voter identification information, such as a unique ID number created for electronic voting purposes (perhaps issued by the town or locality that manages the voting for the particular voter), or an access card that can be read by an ATM (which could be a typical bank ATM access or debit card, or a credit card, or a special voting card that looks like a credit card), along with a personal identification number (PIN) (which may be the voter's social security number), that is input after the card is read. The equipment is enabled to accept such voter identification information. In response to the input of proper voter identification information, information relating to the vote to be cast is displayed at the equipment. The user is then allowed to cast votes using one or more equipment functions. A particular equipment function is established as an indication of finalization of the vote, and when such function is accomplished by the user, the finalized vote is automatically tallied.

The voter identification information may comprise an access card that can be read by an ATM, along with a PIN. The voter identification may encode at least the voter's voting district, the voter's name, the voter's address, and the voter's party affiliation. In the United States, every person is issued a unique social security number, so that this could also comprise the unique voter ID. Outside the US, many countries also issue a person-specific identification number that can be used as a voter identification number. The information relating to the vote to be cast may comprise candidate names and the issues to be voted upon. An ATM function indicating vote finalization may be the "accept" key.

The method may further comprise the ability to display or print voting selections before their finalization, upon voter request. The voting selections are preferably printed using the receipt function of the ATM machine.

Allowing the user to cast votes using ATM functions may include providing user control over scrolling through ATM display screens. The method may further comprise disabling further use of the voter identification information upon the tallying of the finalized vote. The method may still further comprise establishing an account for each candidate and/or issue to be voted upon, and wherein automatically tallying the finalized vote comprises depositing into the appropriate account each finalized vote.

The method may also further comprise allowing the user to enter the name of a write-in candidate. This may comprise enabling use of ATM functions to enter letters of the alphabet.

When a credit card or perhaps debit card is used as the ATM access card, or when equipment is used to access the banking network, the voting function can be managed by the card provider. The invention also contemplates the use of other computerized equipment that can be connected to the existing ATM banking network (such as home PCs) to accomplish the voting function. In this case, in which a card reader may not be present, the unique voter ID information can be established as desired; there are numerous possibilities. For one, the user's social security number can be used, and/or a voter ID number provided by the voting district, and/or a banking account number and/or a banking account PIN (e.g., the PIN for an ATM, credit or debit card). This could be a fee-based service, or not. This would allow any person with a credit or debit card or a banking account to vote anywhere, using a voting-enabled ATM or a PC. ATM networks (such as Cirrus, NYCE, MAC and the like) can be voting-enabled, which would allow any ATM or PC on the network, or other equipment that is connected to the network (e.g., through the Internet), to be used to cast a vote.

BRIEF DESCRIPTION OF THE DRAWING

Other objects, features and advantages will occur to those skilled in the art from the following description of the preferred embodiment, and the accompanying drawing, which is a schematic diagram of a system for accomplishing the method of this invention.

DESCRIPTION OF THE PREFERRED EMBODIMENT OF THE INVENTION

The present invention provides a low cost electoral methodology which will meet the most exacting requirements. The US banking system is remarkable in both its accuracy, security and ease of access. This invention uses certain aspects of the banking system for the purpose of voting. The key elements consist of the following:

1. ATM machines are accurate and well controlled means of depositing money to accounts. These same machines, through simple software modifications, could be used to deposit votes to a candidate's "account".

2. Each registered voter would be issued unique voter identification information that can be input into an ATM. This could be a unique identification number that is input using the keypad. Alternatively, this could comprise a "Voting Access Card" (VAC) and a PIN number. The VAC would have the format of a standard bank or credit card so that it could be read by an ATM. The voter identification information would be issued by the local voter registration office prior to the election. The information would access, or encode, appropriately encrypted information to identify the voter by name and address, to define the voting district of the voter, and potentially other relevant voting-related information, such as party affiliation, which is sometimes required in primary elections. Another alternative would be to allow a voter to use an existing credit or debit card and the PIN for that card (or the user's social security number or another unique number), as the means of enabling the voting function and identifying the voter.

3. On election day, the ATM machines or the ATM network would be loaded with software that would recognize the particular form or forms of identification information used, for example to read the VAC, and accept the PIN. This would, on demand, convert the ATM into a highly accurate and secure voting machine. This could be accomplished over an ATM network.

In operation, the voter could approach any designated ATM on election day for the purpose of voting. He would insert his VAC, credit or debit card into the machine, and enter his PIN number just as if he was banking, or use another appropriate means to enter into the ATM his unique voter identification information, for example by entering a code using the keypad of the ATM. When a card is used, the code information on the card could identify the card as a VAC, and identify at least the voting district. If a credit or debit card is used, the user is identified, and a database can contain the voting district, party affiliation, and/or any other voter-specific information relevant to the particular vote.

The identification would bring up a voting screen, or scroll through several screens as necessary to present all candidates and issues on which the voter can vote. One possibility would be that when the ATM "welcome" screen came up, one of the selections could be "voting", or perhaps "other", in which case the "other" screen would have a "voting" option. The voter could select his choices in the same manner that menu decisions are made in the ATM, typically accomplished by pressing designated keys on the ATM. Once the choices were made, the "enter" key would be pressed. The software would then cause the ATM to display on the monitor, and/or print out using the ATM receipt printer functionality, a summary list of the selection, and provide the user the opportunity to accept the vote or votes/choices, or repeat all or part of the process, by either repeating all voting screens from the beginning, or allowing the user to scroll back through screens to find the particular screen(s) that display the choice he desires to change.

When the "accept" key was pressed, the votes would be deposited to the correct accounts. The software will note that the person to whom the voter identification was issued has voted, and terminate the ability for the identification to be re-used.

Write in candidates could be entered by selecting "Other" for the selection, and by using alphabet keys or a touch screen to enter the name.

Some communities require an ID to vote. This can be done by requiring the ID to be presented when supplying the voter identification information. The use of a unique ID number, or a VAC with a PIN, or a unique credit or debit card and PIN, makes the voter identification information useless to other parties. The unique identification also allows the voting transaction to carry a charge, particularly when a credit or debit card is used.

FIG. 1 depicts system 10 for accomplishing the method of the invention. The system takes advantage of the existing network of ATM machines 12–14. These machines are connected over network 15 to voting server 16 for accomplishing the invention. The server defines separate "accounts" for each candidate, each issue, and anything else to be voted upon in the particular election. These accounts could be established as simple databases.

Elections are accomplished today by breaking the entire voting public into a series of precincts. This same organizational structure can be easily maintained in this invention. There would be, for example, one server for each precinct. Alternatively, the server could handle more than one precinct and be appropriately set up to tally votes on a precinct basis as is currently done among precincts in a particular jurisdiction.

For private ATM networks, the server would simply need access to the network and be enabled to communicate within the particular network architecture. It would also be possible to connect different ATMs or PCs to a server using the Internet as the network. The security needed to accomplish this is already in existence.

The above-described system could be used as the sole vehicle for voting or in conjunction with other safe systems. It also could be used at any location on the globe including military stations, eliminating the present problem with military and other absentee ballots.

What is claimed is:

1. A method for secure, electronic, distributed voting using computer equipment connected to the banking network to process votes, in which each voter uses a voter identification that can be input into the equipment, comprising:

enabling the equipment to receive the voter identifications;

in response to the receipt of a voter identification, displaying information relating to the vote to be cast;

allowing the user to cast votes using one or more functions of the equipment;

identifying a particular equipment function as an indication of finalization of the vote; and in response, automatically tallying the finalized vote.

2. The secure, electronic, distributed voting method of claim 1, wherein the equipment comprises existing automated teller machines (ATMs).

3. The secure, electronic, distributed voting method of claim 2, wherein the ATM function indicating vote finalization is a push of the "accept" key.

4. The secure, electronic, distributed voting method of claim 2, further comprising displaying voting selections before their finalization, wherein voting selections are printed using the ATM receipt printer.

5. The secure, electronic, distributed voting method of claim 2, wherein allowing the user to cast votes using ATM functions includes providing user control over scrolling through ATM display screens.

6. The secure, electronic, distributed voting method of claim 2, further comprising allowing the user to enter the name of a write-in candidate, wherein allowing the user to enter the name of a write-in candidate comprises enabling use of ATM functions to enter letters of the alphabet.

7. The secure, electronic, distributed voting method of claim 1, wherein the voter identification comprises an access card and a personal identification number (PIN).

8. The secure, electronic, distributed voting method of claim 7, wherein the voter identification also encodes the voter's name.

9. The secure, electronic, distributed voting method of claim 8, wherein the voter identification also encodes the voter's party affiliation.

10. The secure, electronic, distributed voting method of claim 1, wherein the voter identification encodes at least the voter's voting district.

11. The secure, electronic, distributed voting method of claim 10, wherein the voter identification also encodes the voter's address.

12. The secure, electronic, distributed voting method of claim 1, wherein the information relating to the vote to be cast comprises candidate names.

13. The secure, electronic, distributed voting method of claim 1, wherein the information relating to the vote to be cast comprises issues to be voted upon.

14. The secure, electronic, distributed voting method of claim 1, further comprising displaying or printing voting selections before their finalization.

15. The secure, electronic, distributed voting method of claim 1, further comprising disabling further use of the access card to access voting information, upon the tallying of the finalized vote.

16. The secure, electronic, distributed voting method of claim 1, further comprising establishing an account for each candidate, and wherein automatically tallying the finalized vote comprises depositing into the account each finalized vote for the candidate.

17. The secure, electronic, distributed voting method of claim 1, further comprising allowing the user to enter the name of a write-in candidate.

18. The secure, electronic, distributed voting method of claim 1, wherein the voter identification comprises a credit card.

19. The secure, electronic, distributed voting method of claim 1, wherein the voter identification comprises a debit card.

20. The secure, electronic, distributed voting method of claim 18, wherein the voter identification further comprises a personal identification number (PIN).

21. The secure, electronic, distributed voting method of claim 19, wherein the voter identification further comprises a personal identification number (PIN).

* * * * *